US010275141B2

(12) United States Patent
Youngberg et al.

(10) Patent No.: US 10,275,141 B2
(45) Date of Patent: Apr. 30, 2019

(54) SYSTEMS AND METHODS FOR OVERLAYING A DIGITAL MINI GUIDE ONTO A VIDEO STREAM

(71) Applicant: DISH TECHNOLOGIES LLC, Englewood, CO (US)

(72) Inventors: Toby Youngberg, Lehi, UT (US); William Joseph Harvey, III, Lehi, UT (US); Christian Holbrook, Lehi, UT (US); Anthony Birdsong, Orem, UT (US); Eric Herrmann, Centerville, UT (US)

(73) Assignee: DISH TECHNOLOGIES LLC, Englewood, CO (US)

( * ) Notice: Subject to any disclaimer, the term of this patent is extended or adjusted under 35 U.S.C. 154(b) by 135 days.

(21) Appl. No.: 14/587,272

(22) Filed: Dec. 31, 2014

(65) Prior Publication Data

US 2016/0188194 A1 Jun. 30, 2016

(51) Int. Cl.
*H04N 5/445* (2011.01)
*G06F 3/0485* (2013.01)
*H04N 21/4782* (2011.01)
*H04N 21/61* (2011.01)
*H04N 21/81* (2011.01)
*H04N 21/234* (2011.01)
*H04N 21/462* (2011.01)
(Continued)

(52) U.S. Cl.
CPC ..... *G06F 3/04855* (2013.01); *H04N 21/2187* (2013.01); *H04N 21/23424* (2013.01); *H04N 21/4312* (2013.01); *H04N 21/4622* (2013.01); *H04N 21/472* (2013.01); *H04N 21/4782* (2013.01); *H04N 21/482* (2013.01); *H04N 21/6125* (2013.01); *H04N 21/8173* (2013.01); *H04N 2005/44556* (2013.01)

(58) Field of Classification Search
CPC .............. G06F 3/04855; H04N 21/472; H04N 2005/44543; H04N 21/42216; H04N 2005/44582; H05N 2005/44556
See application file for complete search history.

(56) References Cited

U.S. PATENT DOCUMENTS 6,678,891 B1 * 1/2004 Wilcox .............. G06Q 30/0601
348/E5.105
6,910,191 B2 * 6/2005 Segerberg .......... H04N 5/44543
348/E5.105
(Continued)

OTHER PUBLICATIONS

Holly, Russell, Walking through Android TV with Google's ADT-1, www.androidcentral.com, Aug. 2, 2014, http://www.androidcentral.com/walking-through-android-tv-googles-adt-1 [retrieved Mar. 29, 2016].
(Continued)

*Primary Examiner* — Dino Kujundzic
(74) *Attorney, Agent, or Firm* — Lorenz & Kopf LLP

(57) ABSTRACT

Systems and methods are described for superimposing a program guide browser onto a video stream. The method includes receiving a request from the client while media content is displayed at the host; in response to the request, transmitting a user interface (UI) to the client; and displaying the UI at the client without interrupting the displayed media content; wherein the UI comprises a horizontally scrollable ribbon. Additional or alternate features may be provided as desired.

17 Claims, 3 Drawing Sheets

(51) Int. Cl.
*H04N 21/472* (2011.01)
*H04N 21/431* (2011.01)
*H04N 21/2187* (2011.01)
*H04N 21/482* (2011.01)

(56) References Cited

U.S. PATENT DOCUMENTS

| | | | |
|---|---|---|---|
| 7,650,569 B1* | 1/2010 | Allen | G06F 3/0482 |
| | | | 715/720 |
| 8,365,230 B2* | 1/2013 | Chane | H04N 5/44543 |
| | | | 725/59 |
| 8,775,938 B2* | 7/2014 | Rosser | G06F 17/30056 |
| | | | 715/730 |
| 2003/0145331 A1* | 7/2003 | Escobar | H04N 7/17318 |
| | | | 725/110 |
| 2003/0151621 A1 | 8/2003 | McEvilly et al. | |
| 2004/0003406 A1* | 1/2004 | Billmaier | G06F 1/3203 |
| | | | 725/60 |
| 2005/0071782 A1* | 3/2005 | Barrett | H04N 5/45 |
| | | | 715/838 |
| 2006/0037045 A1* | 2/2006 | Hsieh | H04N 5/44591 |
| | | | 725/43 |
| 2007/0209018 A1* | 9/2007 | Lindemann | G06F 3/04855 |
| | | | 715/784 |
| 2010/0083312 A1 | 4/2010 | White et al. | |
| 2010/0153999 A1* | 6/2010 | Yates | H04N 5/44543 |
| | | | 725/39 |
| 2011/0231878 A1* | 9/2011 | Hunter | H04N 5/44543 |
| | | | 725/48 |
| 2012/0079429 A1* | 3/2012 | Stathacopoulos | G06F 17/30979 |
| | | | 715/830 |
| 2012/0291079 A1 | 11/2012 | Gordon et al. | |
| 2013/0019263 A1* | 1/2013 | Ferren | G06F 13/00 |
| | | | 725/37 |
| 2013/0042271 A1 | 2/2013 | Yellin et al. | |
| 2013/0324247 A1* | 12/2013 | Esaki | H04N 21/4312 |
| | | | 463/31 |
| 2014/0007163 A1* | 1/2014 | Johnson | H04N 21/482 |
| | | | 725/43 |
| 2014/0178052 A1 | 6/2014 | Kim | |
| 2015/0312618 A1* | 10/2015 | McElhatten | H04N 5/44543 |
| | | | 725/53 |

OTHER PUBLICATIONS

Anonymous, LG Makes Smart TV Simple With New Webos Smart TV Platform | LG Newsroom, LG Newsroom, Jan. 7, 2014, http://www.lgnewsroom.com/2014/01/lg-makes-smart-tv-simple-with-new-webos-smart-tv-platform/ [retrieved Mar. 29, 2016].

International Search Report and Written Opinion, International Application No. PCT/US2015/067809, dated Mar. 2, 2016.

The International Bureau of WIPO, International Preliminary Report on Patentability for International Application No. PCT/US2015/067809 dated Jul. 13, 2017.

* cited by examiner

SYSTEMS AND METHODS FOR OVERLAYING A DIGITAL MINI GUIDE ONTO A VIDEO STREAM

TECHNICAL FIELD

The present disclosure generally relates to systems and methods for providing media content and information regarding the media content over a network. Such systems and techniques may be useful, for example, in navigating a user interface (UI) of available content while viewing a current video selection.

BACKGROUND

Most television viewers receive their television programming through a cable, direct broadcast satellite (DBS), IPTV or similar subscription-based service. To that end, television service is usually broadcast from a cable, DBS or other content aggregator to multiple subscribers. The subscribers may then view received content as live broadcasts from any one of a plurality of client devices connected to a home network, and may similarly browse available content from any connected device.

At the same time, the Internet and other digital communications networks continue to have significant effects on every aspect of personal and professional life. Network communications are becoming increasingly ubiquitous due to the reduced cost and increased performance of portable computing devices, as well as the increasing prevalence and capability of mobile telephony and other wireless communications technologies. Additionally, more and more devices, including set top boxes (STBs), television receivers, personal or digital video recorders (DVRs), placeshifting devices and the like are becoming enabled for communications over digital networks. Consumers therefore expect convenient modalities for browsing available media content from a wide range of devices and settings.

Digital streaming media services such as Netflix™, Hulu™ Plus, and Amazon™ Prime employ a "browse-then-watch" metaphor for navigating and viewing subscription content. For example, a user must first terminate or suspend the current viewing session, navigate through available content choices, select the next movie, television show, or the like, and then terminate the browsing session and begin viewing the most recently selected content. That is, the user must interrupt the current viewing session, switch to a browsing mode, and thereafter return to a viewing mode. Other services shrink the current video frame, push it to one corner of the screen, and display a viewing guide in the remaining portion of the screen.

Presently known media distribution paradigms lack the ability to browse available content without substantially disrupting the current viewing session. Moreover, presently known guides are typically presented in the form of a grid containing textual information.

Systems and methods are thus needed which overcome these limitations.

BRIEF SUMMARY

According to various exemplary embodiments, systems and methods are described for displaying an interactive user guide in a graphically appealing manner which minimally disrupts the then current viewing session. In some embodiments, during a video viewing session, a browsing session is overlaid onto the video being viewed in response to a viewing guide request received from the client. In this way, a viewer may browse for content in the context of the current video viewing session, without shrinking or stretching the frame size of the video session. Information about the available content is displayed in a graphical hierarchy, such as horizontally scrollable ribbons superimposed on the lower portion of the screen.

In an embodiment, the ribbons present a master/detail paradigm, such that the top ribbon displays categories of content (e.g., channels, genre), and a lower ribbon displays details of a selected category. The navigation hierarchy may be abstracted to any number of dimensions, whereby successively increasing embedded detail for a selected tile is displayed in a subsequent ribbon. Other embodiments may also display control instructions to change channels, to fast forward or rewind content, to adjust user preferences, and/or to take any other actions as desired.

Other embodiments provide a hardware environment in which the video decoder and the graphics driver are implemented in the same processor or processing system, thereby reducing cost and hardware complexity. In this way, the interactive user guide interface may be superimposed over the video on virtually any state of the art television, smart phone, lap top or tablet computer, or the like.

Various other embodiments, aspects and features are described in more detail below.

BRIEF DESCRIPTION OF THE DRAWING FIGURES

Exemplary embodiments will hereinafter be described in conjunction with the following drawing figures, wherein like numerals denote like elements, and:

DETAILED DESCRIPTION

Figure 1:
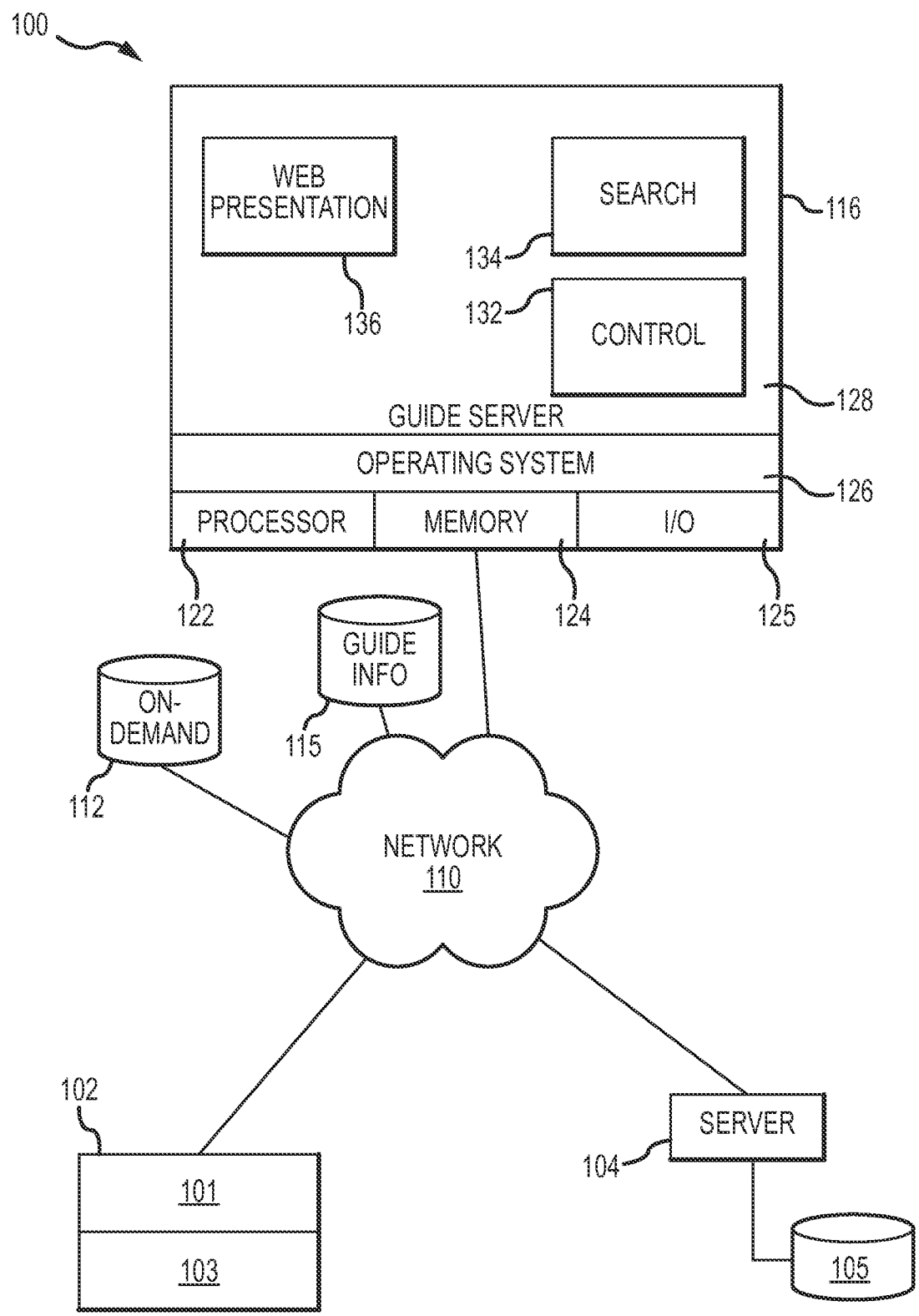
FIG. 1 is a block diagram of an exemplary host system including a guide server and content server in accordance with an embodiment.

The following detailed description of the invention is merely exemplary in nature and is not intended to limit the invention or the application and uses of the invention. Furthermore, there is no intention to be bound by any theory presented in the preceding background or the following detailed description.

According to various embodiments, an interactive user guide interface is presented to a user upon request, in the form of horizontally scrollable ribbons disposed in the lower portion of a video screen. in a preferred embodiment, guide overlays and hence cover up the lower portion (e.g., the lower third) of the viewing screen. The guide comprises a top ribbon which presents the viewer with categories of information, and the bottom ribbon displays a detail view of a selected category.

By way of non-limiting example, categories displayed in the top ribbon may include: available channels (e.g., CBS, NBC, ABC, CNN); genres (e.g., comedy, suspense); sports (e.g., NHL, NFL, MLB, NBA); actors (e.g., Jimmy Stewart, Robert Wagner). Details displayed in the bottom ribbon may include the current, past, and future programs offered by a selected channel, available movies corresponding to a selected genre, available games corresponding to a selected sports league, an interactive search feature, and so on. In a preferred embodiment, the bottom ribbon comprises a sequence of individual tiles, each including one or more photographic, graphical, and textual cues using, for example, the imagery and/or art associated with a particular program or franchise. Accordingly, the ribbon metaphor provides at least three dimensions of navigation hierarchy: i) the master ribbon; ii) the detail ribbon; and iii) the textual/graphical/imagery within each tile.

In other embodiments, the ribbon metaphor may be extrapolated to any number of dimensions, such that selecting an item from the then current detail level produces a successive ribbon comprising a deeper level of detail, much like navigating files and folders on a hard drive. In this regard, the "up, down" buttons on a remote, display, or touch pad may be used to navigate up and down the ribbon hierarchy, and the "left, right" buttons may be used to scroll within a ribbon leveraging the left-to-right temporal/chronological metaphor. The Enter, Return, Select, or other intuitively appropriate key (or virtual button) may be used to select an item or tile from within the hierarchy.

In contrast to presently known set top boxes which typically implement graphics drivers and video decoding in software, various embodiments integrate these functions in a single hardware implementation, for example, in a single or multi-core processor, chip set, central processing unit (CPU) or other processing system. In this way, the graphical user interface (GUI) may be overlaid or superimposed onto the video stream seamlessly and cost effectively. Moreover, high bandwidth network protocols allow the system to simultaneously download live video and the GUI graphics over the same pipe in real time.

Various embodiments therefore provide a relatively robust set of functions and features to the viewer that can be conveniently accessed using conventional web protocols and existing client devices. Other embodiments may provide alternate or additional features, as desired.

Turning now to the drawing figures and with initial reference to FIG. 1, an exemplary media delivery system 100 useful in overlaying a media guide user interface onto a video stream includes a media server 104 for pushing media content 105, and a media guide server 116 for pushing information regarding available programming, to a client 102 via a network 110. The client 102 is configured to present content 101 on a display screen, monitor, or the like, and to overlay a user interface (or browser) 103 onto a bottom portion of the screen in response to a user request for the browser.

Upon receiving a request from a client 102, the host 116 establishes a session with the media server 104 to access available programming. The host 116 also retrieves program guide information from a guide database 115, which may be a stand-alone database, integrated with the host 116 or media 115, or otherwise available to the host 116. This information may be appropriately processed and/or formatted (e.g., as a plurality of ribbons) and provided to client 102 via network 110. Some implementations may provide robust searching of content 105 and/or guide information 115, for example. Such searching may also consider information 112 about on-demand programming, and/or other information as desired in addition to information obtained from media server 104. Other embodiments may additionally or alternately provide the ability to change preferences or other settings on media server 104, to view media content 105 in a web browser or other window, and/or to take any other actions as may be desired.

Client 102 may be any device, component, module, hardware, software application and/or the like that is capable of communicating over network no. To that end, many different types of clients 102 may be implemented with any sort of general or special purpose hardware, software and/or firmware. In some embodiments, client 102 may be a conventional personal computer, portable computer, workstation and/or other computing system. In still other embodiments, some types of clients 102 may include personal digital assistants, video game players, mobile telephones, network appliances, network-enabled remote controls and/or any other devices capable of communicating on network 110.

In the embodiment shown in FIG. 1, client 102 may execute any sort of conventional browser application that is compatible with standard Internet, world wide web (WWW) and/or other formats. Conventional web browsers available for a number of different computing platforms include the INTERNET EXPLORER, MOZILLA FIREFOX, SAFARI, CHROME, and OPERA browsers, as well as many others. Such browsers 103 are typically capable of displaying active or other documents formatted in accordance with published protocols (e.g., hypertext markup language (HTML), extensible markup language (XML), and/or the like). Many browsers are also capable of executing "plugin" applications, applets or the like. Such plugins may be formatted in accordance with ActiveX, JAVA and/or any number of other formats.

In some embodiments, client 102 includes a media application including a graphics and/or video driver in the form of a software module, or the media application may be implemented in hardware (e.g., integrated into the processor associated with the client device). In other embodiments, the media application could be implemented as a plugin or other applet that runs within the browser, as desired. In some embodiments, the media application may be initially obtained from a networked host, such as host 116. The application may be retrieved on an as-needed basis in some embodiments, or may be stored at client 102 for subsequent execution.

Network 110 is any digital or other communications network capable of transmitting messages between senders (e.g., media server 104) and receivers (e.g., media server 104). In various embodiments, network 110 includes any number of public or private data connections, links or networks supporting any number of communications protocols. Network 110 may include the Internet, for example, or any other network. Such networks may be based upon TCP/IP or other conventional protocols, although other embodiments may use any type of alternate or successor protocols, as desired. In various embodiments, network no may also incorporate a wireless and/or wired telephone network, such as a cellular communications network for communicating with mobile phones, personal digital assistants, and/or the like. Various embodiments of network 110 may also incorporate any sort of wireless or wired local area networks, such as one or more IEEE 802.3 and/or IEEE 802.11 networks.

Media server 104 is any device or system communicating on network 110 that is capable of receiving, recording, placeshifting and/or otherwise processing media content 105. In various embodiments, media server 104 includes a personal or digital video recorder (DVR) feature that allows the server 104 to record received programming for later viewing. A DVR may a standalone device, or may be integrated within any sort of receiver (e.g., a cable, direct broadcast satellite (DBS) or other set top box (STB)) that is capable of receiving and demodulating programming signals. Other embodiments of media server 104 may include any sort of standalone or hybrid media players, file servers and/or the like that are capable of receiving, storing or otherwise processing streaming or file-based content 105 of any sort. Still other embodiments of media server 104 could implement a networked gaming server or other media service as desired.

Content 105 is any sort of file-based programming or other content that is accessible to media server 104. In various embodiments, content 105 represents stored programming that is received from an internal or external television receiver. Content 105 may also represent programming received from a camera, network server and/or other source, as desired. Content may be stored in any media, including in memory, on a hard disk, on a networked server, and/or in any other digital, optical or other available storage medium. Content 105 may be stored in any sort of compressed or uncompressed format, as desired, and may be encoded or transcoded as desired for effective receipt, storage, retrieval and playing.

Host 116 is any server or other network host capable of interacting with one or more clients 102 to provide instructions to one or more servers 104. In various embodiments, host 116 is a program guide server that also allows integration of program guide information 115 and/or information about available on-demand programming 112 or the like with information about content 105, as described more fully below.

FIG. 1 shows one example of a host 116 that could be used to provide a guide server that interacts with any number of clients 102 and servers 104. To that end, each host 116 within system 100 may be implemented with a server computer system or service that is based upon any processor, architecture and/or operating system. Each host 116 will typically by implemented using any sort of conventional processing hardware 122, memory 124 and input/output features 125. Various embodiments may be implemented using dedicated or shared hardware servers; other implementations may make use of virtual server features as part of a "cloud computing" service, such as any of the cloud computing services provided by AMAZON, GOOGLE, MICROSOFT, IBM, UBUNTU, SUN MICROSYSTEMS and/or any number of other providers.

Although FIG. 1 shows a single host 116 for convenience, many practical embodiments may provide a cluster or other collection of multiple hosts 116 to support any desired number of simultaneous connections. This cluster may also incorporate appropriate routing, load balancing, access and security mechanisms and or any number of other features. In various embodiments, each host 116 is an actual or virtual computer system executing an operating system 126 such as any version of LINUX, UNIX, SOLARIS, NETWARE, WINDOWS, OS/X, AIX and/or the like. The various UNIX/LINUX operating systems typically provide a computing core that is capable of executing a guide server application 128, as well as any number of daemons, processes, applications or other instance modules as desired. For example, a guide server application 128 could execute as a daemon on host 116, with connections to separate clients 102 being managed as separate processes or instances that communicate with server application 128 using features provided by operating system 126.

Guide server application 128 is typically initiated when host 116 is booted or otherwise initialized. In various embodiments, application 128 suitably registers with any appropriate load balancers or other routers so that connections with clients 102 can be appropriately distributed. Application 128 then processes connection requests from clients 102 as appropriate. In the embodiment shown in FIG. 2, guide server application 128 contains control logic 132 for controlling remotely-located servers 104 and a web server or other presentation logic 136 for providing information to client 102 in a web-based or other format that can be conveniently presented to the user. Various embodiments may also provide search engine logic 134 as desired; this search engine may perform an integrated search of information about content 105 that is stored with the remote media server 104, as well as any program guide information 115 and/or information about on-demand programming 112 as desired. Such information 112, 115 may be obtained from any database or other source available to host 116, including any database executing on a separate server or the like.

Control module 132 contains any appropriate programming logic to establish sessions over network 110 with one or more media servers 104 in response to requests received from clients 102. Such sessions can be used to retrieve information from the media server 104 and/or to provide instructions to the media server as desired. In various embodiments, interaction between client 102 and host 116 is implemented within the context of a conventional web session that allows active and/or passive web content to be displayed within the browser 103; other embodiments may use different structures or techniques as desired.

Interactions between host 116 and client 102 may be managed in any manner. In various embodiments, client 102 interacts with host 116 using a conventional web browser that can receive information from a conventional web server. Such information may be provide as part of dynamic or active web content (e.g., using ASP, JAVASCRIPT, Cold Fusion, PHP and/or other content, or using JAVA, ACTIVEX and/or other plugins), and/or as static content (e.g., using HTML, XML or similar constructs). In various embodiments, a conventional web page or similar document may be displayed with embedded active content that allows the user to interact with a program guide or other information using conventional graphical user interface (GUI) constructs.

Guide server application 128 may provide any alternate and/or additional functions and features as desired. Generally, guide server application 128 is at least partially implemented using conventional compiled object code derived from source code in any programming language (e.g., C, C++ or the like). Other embodiments may make use of an interpreted or other abstracted environment, such as the JAVA environment available from Sun Microsystems of Sunnyvale, Calif. or the .NET environment available from Microsoft Corporation of Redmond, Wash. Other embodiments may implement the various components of guide server application 128 using any other programs, programming languages, scripting languages, development or execution environments, and/or the like. Such programming may be stored in source or object code form on any digital storage medium (e.g., memory 124, mass storage, removable media, or any other medium) that is accessible to guide server application 128.

Figure 2:
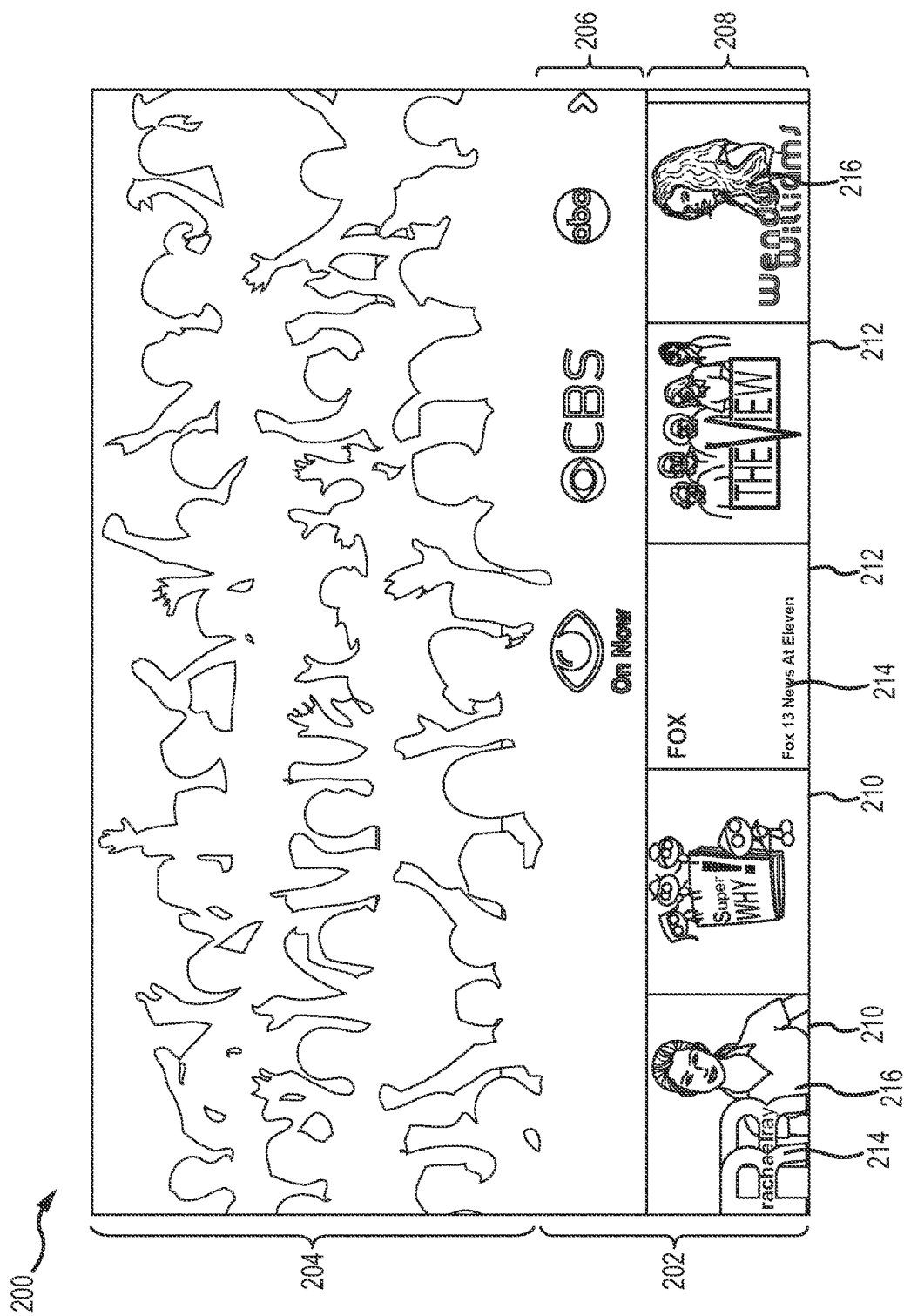
FIG. 2 is a screen shot of a ribbon based guide hierarchy overlaid onto a video in accordance with an embodiment.

Turning now to FIG. 2, a screen shot 200 illustrates a ribbon based guide 202 overlaid onto program content 204 in accordance with an embodiment. More particularly, the program content 204 may occupy the entire screen when the guide 202 is not present. When summoned by the user, the guide 202 is overlaid, superimposed, or otherwise integrated onto the same screen as the viewed program, for example, over the lower portion (e.g., the lower third, half, quarter) of the screen. In various embodiments, the aspect ratio of the program content remains intact while the user interface is displayer; that is, the frame size of the program being viewed is neither increased nor decreased. Alternatively, the frame size may be re-formatted onto that portion of the available screen not occupied by the UI.

With continued reference to FIG. 2, the UI 202 includes a first ribbon 206 and a second ribbon 208. In the illustrated embodiment, the first ribbon 206 comprises a scrollable listing of available channels which, when selected by the user, reveal a deeper level of detail in a subsequent ribbon. The second (lower) ribbon 208 comprises a scrollable sequence of individual tiles 210, each including one or more of branding or franchise (e.g., channel, network, or program) information 212, textual and/or graphical information 214, and/or photographic or other imagery 216.

Figure 3:
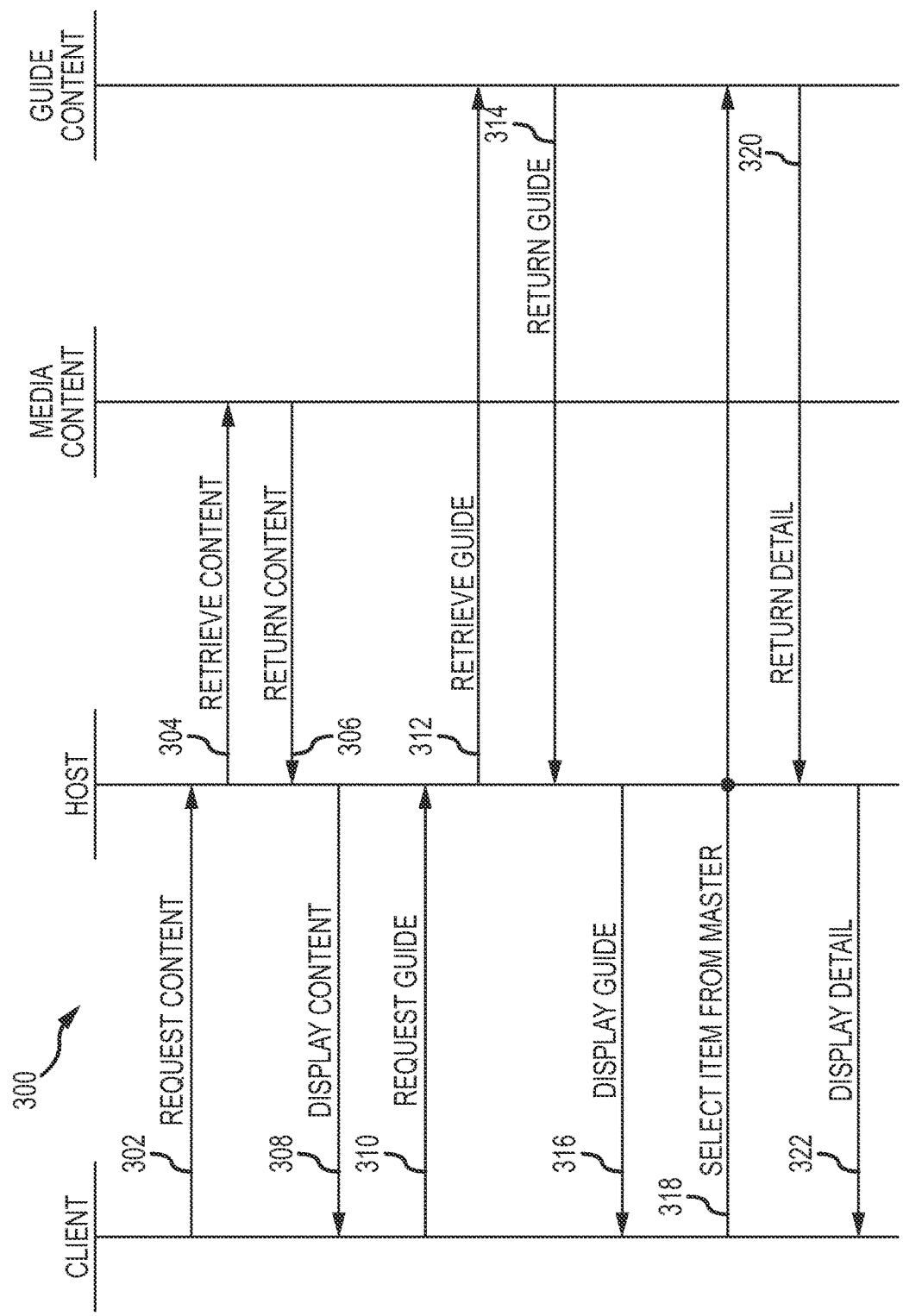
FIG. 3 is a flow diagram of an exemplary process for navigating a content hierarchy during a video session in accordance with an embodiment.

Turning now to FIG. 3, an exemplary process 300 for simultaneously providing media content and a searchable program guide to a client 102 over network 110 is shown. Generally speaking, process 300 involves establishing a session 212 between host 106 and media server 104 in response to a request 204 received from a client 102. Host 116 also interacts with client 102 as desired to provide program information and media content, to receive instructions, and/or for any other purpose. The various functions shown in FIG. 3 may be performed by software, firmware or other programmable instructions stored within and executed by the various components of FIG. 1, as appropriate.

With continued reference to FIG. 3, in various embodiments the client requests (function 302) content to be viewed, whereupon the host retrieves (function 304) the content from the content server. The media server returns (function 306) the requested content to the host, which pushes (function 309) the selected content to the client for viewing.

While the elected content is being viewed, the user may request (function 310) a program guide or other user interface to facilitate navigating through a hierarchy of available content for subsequent viewing. The host retrieves (function 312) the guide information from the guide server, whereupon the guide server returns (function 314) the guide information to the host. The guide information is then transmitted to the client device (function 316), where it is populated into an appropriate UI and overlaid onto the then current program being viewed.

With continued reference to FIG. 3, the user may select (function 318) an item from the master ribbon (e.g., the top ribbon), whereupon the guide server returns (function 320) the corresponding detail for the selected item to the host. The host then pushes (function 322) the detail to the client, for display in the second (e.g., bottom) ribbon.

A method executable by a host communicating with a client over a network is thus provided. The method includes: receiving a request from the client while media content is displayed at the host; in response to the request, transmitting a user interface (UI) to the client; and displaying the UI at the client without interrupting the displayed media content; wherein the UI comprises a horizontally scrollable ribbon.

In an embodiment, the media content comprises a video stream, and the host comprises a server configured to simultaneously transmit the media content and the UI to the client.

In an embodiment, displaying the UI comprises overlaying the UI on top of the displayed media content while maintaining the shape size of the displayed media content.

In an embodiment, displaying the UI comprises overlaying the UI on a bottom portion of the displayed media content, where the bottom portion may be in the range of 10% to 50% of the height of the displayed media content.

In an embodiment, transmitting the UI comprises forming a web page with program guide information and transmitting the web page to an application executing on the client.

In an embodiment, the UI comprises a first horizontally scrollable ribbon comprising topic tiles and a second horizontally scrollable ribbon comprising detail tiles pertaining to one of the topics.

In an embodiment, the method also includes changing the then current media content to display new media content corresponding to the selected detail tile in response to a user selecting one of the detail tiles.

In an embodiment, the method also includes presenting a third ribbon comprising further detail corresponding to the selected detail tile in response to a user selecting one of the detail tiles.

A media delivery system is also provided which includes: a host configured to simultaneously transmit a video stream and an interactive program guide browser to a client device; and a processor configured to simultaneously decode the video stream and display the browser at the client device; wherein the system is configured to provide an integrated display at the client device, the integrated display including a master ribbon comprising selectable channel tiles overlaid onto a bottom portion of a video frame.

In an embodiment, the integrated display further includes a detail ribbon comprising selectable program tiles overlaid on the bottom portion of the video frame.

In an embodiment, the detail ribbon abuts a bottom horizontal edge of the video frame, and the master ribbon abuts a top horizontal edge of the detail ribbon, and the master and detail ribbons are independently horizontally scrollable.

In an embodiment, the integrated display further includes a third ribbon disposed adjacent the detail ribbon and comprises additional information corresponding to a selected program tile.

In an embodiment, the media delivery system is further configured to overlay the browser without interrupting the video stream while maintaining the shape size of the video frame.

In an embodiment, the at least one program tile comprises textual, photographic, and branding imagery.

In an embodiment, the media delivery system is further configured to change the then current video stream and display a new video stream in response to a user selecting one of the program tiles.

An integrated display provided by a host to a client device comprises: a substantially rectangular frame; a live stream video provided within the frame; and a program guide overlaid onto a portion of the live stream video, the program guide including a master ribbon and a detail ribbon; wherein the master and detail ribbons are horizontally scrollable.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents. The term "exemplary" is used herein to represent one example, instance or illustration that may have any number of alternates. Any implementation described herein as "exemplary" is not necessarily to be construed as preferred or advantageous over other implementations.

What is claimed is:

1. A method executable by a host communicating with a client over a network, the method comprising:
   receiving a request from the client while media content is displayed at the host;
   in response to the request, transmitting a user interface (UI) to the client; and
   displaying the UI at the client without interrupting the displayed media content;
   wherein the UI comprises a horizontally scrollable first ribbon comprising a plurality of horizontally-adjacent first tiles, wherein each tile of the plurality of horizontally-adjacent first tiles comprises an image indicative of an additional media content category, different from a category of the media content being displayed at the host, wherein each image in the first tiles corresponds to a television channel logo, wherein at least two of the plurality of horizontally-adjacent first tiles and their respective images are simultaneously viewable within the horizontally-scrollable first ribbon,
   wherein the UI further comprises a horizontally-scrollable second ribbon, disposed vertically-adjacent to the horizontally-scrollable first ribbon, comprising a plurality of horizontally-adjacent second tiles, wherein each tile of the plurality of horizontally-adjacent second tiles comprises an image of additional media content, different from the media content being displayed at the host, wherein the image of additional media content of each tile of the plurality of horizontally-adjacent second tiles pertains to the additional media content category of one of the plurality of horizontally-adjacent first tiles, wherein each image in the second tiles corresponds to a logo of a television program viewable on the television channel corresponding to the one of the plurality of horizontally-adjacent first tiles, and wherein at least two of the plurality of horizontally-adjacent second tiles and their respective images are simultaneously viewable within the horizontally-scrollable second ribbon, and
   wherein the horizontally-scrollable second ribbon is dependent upon the horizontally-scrollable first ribbon such that each time the horizontally-scrollable first ribbon is scrolled to the left or right, the horizontally-scrollable second ribbon is comprised of a new plurality of horizontally-adjacent second tiles; whereas, the horizontally-scrollable first ribbon is independent of the horizontally-scrollable second ribbon such that each time the horizontally-scrollable second ribbon is scrolled to the left or right, the horizontally-scrollable first ribbon remains unchanged.

2. The method of claim 1 wherein the media content comprises a video stream.

3. The method of claim 1 wherein the host comprises a server configured to simultaneously transmit the media content and the UI to the client.

4. The method of claim 1, wherein displaying the UI comprises overlaying the UI on top of the displayed media content while maintaining the shape size of the displayed media content.

5. The method of claim 4 wherein displaying the UI comprises overlaying the UI on a bottom portion of the displayed media content.

6. The method of claim 5, wherein the bottom portion comprises in the range of 10% to 50% of the height of the displayed media content.

7. The method of claim 1 wherein transmitting the UI comprises forming a web page with program guide information and transmitting the web page to an application executing on the client.

8. The method of claim 1, further comprising:
   in response to a user selecting one of the detail tiles, changing the then current media content to display new media content corresponding to the selected detail tile.

9. The method of claim 1, further comprising:
   in response to a user selecting one of the detail tiles, presenting a third ribbon comprising further detail corresponding to the selected detail tile.

10. A media delivery system comprising:
    a host configured to simultaneously transmit a video stream and an interactive program guide browser to a client device; and
    a processor configured to simultaneously decode the video stream and display the browser at the client device;
    wherein the system is configured to provide an integrated display at the client device, the integrated display including:
    a master ribbon comprising a plurality of horizontally-adjacent first tiles, wherein each tile of the plurality of horizontally-adjacent first tiles comprises an image indicative of an additional media content category, different from a category of the media content being displayed at the host overlaid onto a bottom portion of a video frame, wherein each image in the first tiles corresponds to a television channel logo, wherein at least two of the plurality of horizontally-adjacent first tiles and their respective images are simultaneously viewable within the master ribbon, and
    a detail ribbon, disposed vertically-adjacent to the master ribbon, comprising a plurality of horizontally-adjacent second tiles overlaid on the bottom portion of the video frame, wherein each tile of the plurality of horizontally-adjacent second tiles comprises an image of additional media content, different from the media content being displayed at the host, wherein the image of additional media content of each tile of the plurality of horizontally-adjacent second tiles pertains to the additional media content category of one of the plurality of horizontally-adjacent first tiles, wherein each image in the second tiles corresponds to a logo of a television program viewable on the television channel corresponding to the one of the plurality of horizontally-adjacent first tiles, and wherein at least two of the plurality of horizontally-adjacent second tiles and their respective images are simultaneously viewable within the detail ribbon, and
    wherein the detail ribbon is dependent upon the master ribbon such that each time the master ribbon is scrolled to the left or right, the detail ribbon is comprised of a new plurality of horizontally-adjacent second tiles; whereas, the master ribbon is independent of the detail ribbon such that each time the detail ribbon is scrolled to the left or right, the master ribbon remains unchanged.

11. The media delivery system of claim 10, wherein the detail ribbon abuts a bottom horizontal edge of the video frame, and the master ribbon abuts a top horizontal edge of the detail ribbon.

12. The media delivery system of claim 10, wherein the master and detail ribbons are independently horizontally scrollable.

13. The media delivery system of claim 10, wherein the integrated display further includes:
   a third ribbon disposed adjacent the detail ribbon and comprising additional information corresponding to a selected program tile.

14. The media delivery system of claim 10, further configured to overlay the browser without interrupting the video stream.

15. The media delivery system of claim 10, further configured to overlay the browser while maintaining the shape size of the video frame.

16. The media delivery system of claim 10, wherein at least one program tile comprises textual, photographic, and branding imagery.

17. The media delivery system of claim 10, further configured to change the then current video stream and to display a new video stream in response to a user selecting one of the program tiles.

* * * * *